United States Patent
Shiner

(10) Patent No.: US 11,803,817 B2
(45) Date of Patent: Oct. 31, 2023

(54) VIRTUAL HALLWAY CONVERSATIONS FOR REMOTE COLLABORATION

(71) Applicant: Ciena Corporation, Hanover, MD (US)

(72) Inventor: Andrew D. Shiner, Ottawa (CA)

(73) Assignee: Ciena Corporation, Hanover, MD (US)

( * ) Notice: Subject to any disclaimer, the term of this patent is extended or adjusted under 35 U.S.C. 154(b) by 24 days.

(21) Appl. No.: 17/404,565

(22) Filed: Aug. 17, 2021

(65) Prior Publication Data

US 2022/0067666 A1    Mar. 3, 2022

Related U.S. Application Data

(60) Provisional application No. 63/074,430, filed on Sep. 3, 2020.

(51) Int. Cl.
  *G06Q 10/1093* (2023.01)
  *G06Q 10/10* (2023.01)
  *G06Q 10/0631* (2023.01)

(52) U.S. Cl.
  CPC .. *G06Q 10/1095* (2013.01); *G06Q 10/063118* (2013.01); *G06Q 10/103* (2013.01)

(58) Field of Classification Search
  None
  See application file for complete search history.

(56) References Cited

U.S. PATENT DOCUMENTS

| | | | |
|---|---|---|---|
| 9,143,238 B2 | 9/2015 | Roberts et al. | |
| 10,097,263 B2 | 10/2018 | Shiner et al. | |
| 10,193,620 B2 | 1/2019 | Shiner et al. | |
| 10,749,602 B2 | 8/2020 | Charlton et al. | |
| 10,809,150 B2 | 10/2020 | Shiner et al. | |
| 11,038,549 B1 | 6/2021 | Harley et al. | |
| 11,070,286 B1 | 7/2021 | Shiner et al. | |
| 11,082,157 B2 | 8/2021 | Shiner et al. | |
| 11,451,667 B1* | 9/2022 | Chau | H04L 65/1069 |
| 2006/0182249 A1* | 8/2006 | Archambault | H04L 12/1818 379/202.01 |
| 2014/0222907 A1* | 8/2014 | Seligmann | H04L 65/103 709/204 |

(Continued)

FOREIGN PATENT DOCUMENTS

| | | |
|---|---|---|
| EP | 3 107 255 B1 | 5/2018 |
| EP | 3 847 778 A1 | 7/2021 |

(Continued)

OTHER PUBLICATIONS

Ling, C., Balc, U., Blackburn, J., & Stringhini, G .; A first look at zoombombing. May 2021, 2021 IEEE symposium on security and privacy, pp. 1452-1467 (Year: 2021).*

*Primary Examiner* — Amanda Gurski
(74) *Attorney, Agent, or Firm* — Clements Bernard Walker; Christopher L. Bernard

(57) ABSTRACT

Systems and methods include monitoring users logging into a collaboration service for a corresponding online meeting; and assigning a plurality of the users to a virtual waiting room, separate from any corresponding online meeting, in advance of their corresponding online meeting to enable collaboration in the virtual waiting room. The systems and methods can further include notifying the plurality of users when their corresponding online meeting has started for the plurality of users to leave the virtual waiting room.

20 Claims, 5 Drawing Sheets

(56) References Cited

U.S. PATENT DOCUMENTS

| | | |
|---|---|---|
| 2016/0234264 A1* | 8/2016 | Coffman ............. H04L 65/4053 |
| 2018/0359029 A1 | 12/2018 | Shiner et al. |
| 2021/0194607 A1 | 6/2021 | Shiner et al. |
| 2022/0078218 A1* | 3/2022 | Papava ............... H04L 12/1827 |
| 2022/0311634 A1* | 9/2022 | Sengupta ............ H04L 65/1093 |

FOREIGN PATENT DOCUMENTS

| | | | |
|---|---|---|---|
| WO | WO-2021076136 A1 * | 4/2021 | |
| WO | 2021084342 A1 | 5/2021 | |

\* cited by examiner

VIRTUAL HALLWAY CONVERSATIONS FOR REMOTE COLLABORATION

CROSS-REFERENCE TO RELATED APPLICATION(S)

The present disclosure claims priority to U.S. Provisional Patent Application No. 63/074,430, filed Sep. 3, 2020, the contents of which are incorporated by reference in their entirety.

FIELD OF THE DISCLOSURE

The present disclosure relates generally to networking and computing. More particularly, the present disclosure relates to systems and methods for virtual hallway conversations to support remote collaboration.

BACKGROUND OF THE DISCLOSURE

In March 2020, the workplace changed instantly with the spread of COVID-19, the closures of offices, and the instant shift to Work From Home (WFH). Advanced remote working tools (e.g., video conferencing such as Zoom and Skype, collaboration tools such as Slack and Teams, etc.) fostered the WFH shift. Because of these tools, home networks having high-speed connectivity, the shift to the cloud for Information Technology (IT) resources, etc., the WFH was largely successful, and some even question the need for a physical office. However, the hallway conversation was lost, and the value of such collaboration is a significant loss. As described herein, the hallway conversation is informal conversations about projects, goals, status, ideas, opportunities, etc. between members of loosely related teams, including people who might not normally interact.

The hallways conversation between members of loosely related teams is so important to research and development that fostering it was a guiding principle for the architectural design of the Bell Labs Idea Factory. This is summarized in a 2012 New York Times article, available online at www.nytimes.com/2012/02/26/opinion/sunday/innovation-and-the-bell-labs-miracle.html, which described:

"His (Mervin Kelly's) fundamental belief was that an "institute of creative technology" like his own needed a "critical mass" of talented people to foster a busy exchange of ideas. But innovation required much more than that. Mr. Kelly was convinced that physical proximity was everything; phone calls alone wouldn't do. Quite intentionally, Bell Labs housed thinkers and doers under one roof. Purposefully mixed together on the transistor project were physicists, metallurgists and electrical engineers; side by side were specialists in theory, experimentation and manufacturing. Like an able concert hall conductor, he sought a harmony, and sometimes a tension, between scientific disciplines; between researchers and developers; and between soloists and groups."

"ONE element of his approach was architectural. He personally helped design a building in Murray Hill, N.J., opened in 1941, where everyone would interact with one another. Some of the hallways in the building were designed to be so long that to look down their length was to see the end disappear at a vanishing point. Traveling the hall's length without encountering a number of acquaintances, problems, diversions and ideas was almost impossible. A physicist on his way to lunch in the cafeteria was like a magnet rolling past iron filings."

Various companies have realized the unquantifiable value of the hallway conversation. For example, Steve Jobs was famous for having limited bathrooms in the office to require everyone to congregate together.

When transitioning to a WFH based existence, it is very easy to get access to anyone that we have a direct business reason to communicate with. But we have lost the hallway conversation, namely communication with people we may not have an immediate business reason to communicate, but which may bring some valuable insight.

BRIEF SUMMARY OF THE DISCLOSURE

The present disclosure relates to systems and methods for virtual hallway conversations to support remote collaboration. Specifically, the present disclosure includes an online collaboration platform (e.g., video, audio, etc.) that is usually used for preplanned online meetings. As part of the standard operation with preplanned meetings, the present disclosure includes directing participants to common waiting areas before the start of a preplanned meeting. As such, the common waiting areas are used to create hallway conversations virtually.

In an embodiment, a method includes steps and a non-transitory computer-readable storage medium includes computer-readable code stored thereon for programming at least one processor to perform the steps. The steps include monitoring users logging into a collaboration service for a corresponding online meeting; and assigning a plurality of the users to a virtual waiting room, separate from any corresponding online meeting, in advance of their corresponding online meeting to enable collaboration in the virtual waiting room.

The steps can further include notifying the plurality of users when their corresponding online meeting has started. The steps can further include providing a split screen view between the virtual waiting room and a corresponding online meeting for a user of the plurality of users when the corresponding online meeting begins. The split screen can include a doorway view where the corresponding online meeting is shown in the doorway. Some or all of the plurality of the users assigned to the virtual waiting room can be waiting for different corresponding online meetings.

The assigning can be based on a profile of each of the plurality of users. The steps can further include tracking the assigning of the plurality of users; and utilizing the tracking for future assignments. The steps can further include obtaining data related to interaction of the users, wherein the interaction is via email or other electronic communication mechanisms; and utilizing the data related to interaction of the users, for the assigning. The profile can include a job function.

The steps can further include providing a list of people in the virtual waiting room to a user to allow the user to request the virtual waiting room. The steps can further include providing a meeting host for a corresponding online meeting a list of the plurality of users currently in virtual waiting rooms. The steps can further include providing the plurality of users in the virtual waiting room an option to schedule a future meeting based on their availability.

In another embodiment, an apparatus includes at least one processor and memory storing instructions that, when executed, cause the at least one processor to monitor users logging into a collaboration service for a corresponding online meeting, and assign a plurality of the users to a virtual waiting room, separate from any corresponding online meeting, in advance of their corresponding online meeting to enable collaboration in the virtual waiting room.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for virtual hallway conversations to support remote collaboration. Specifically, the present disclosure includes an online collaboration platform (e.g., video, audio, etc.) that is usually used for preplanned online meetings. As part of the standard operation with preplanned meetings, the present disclosure includes directing participants to common waiting areas before the start of a preplanned meeting. As such, the common waiting areas are used to create hallway conversations virtually.

Collaboration System

Figure 1:
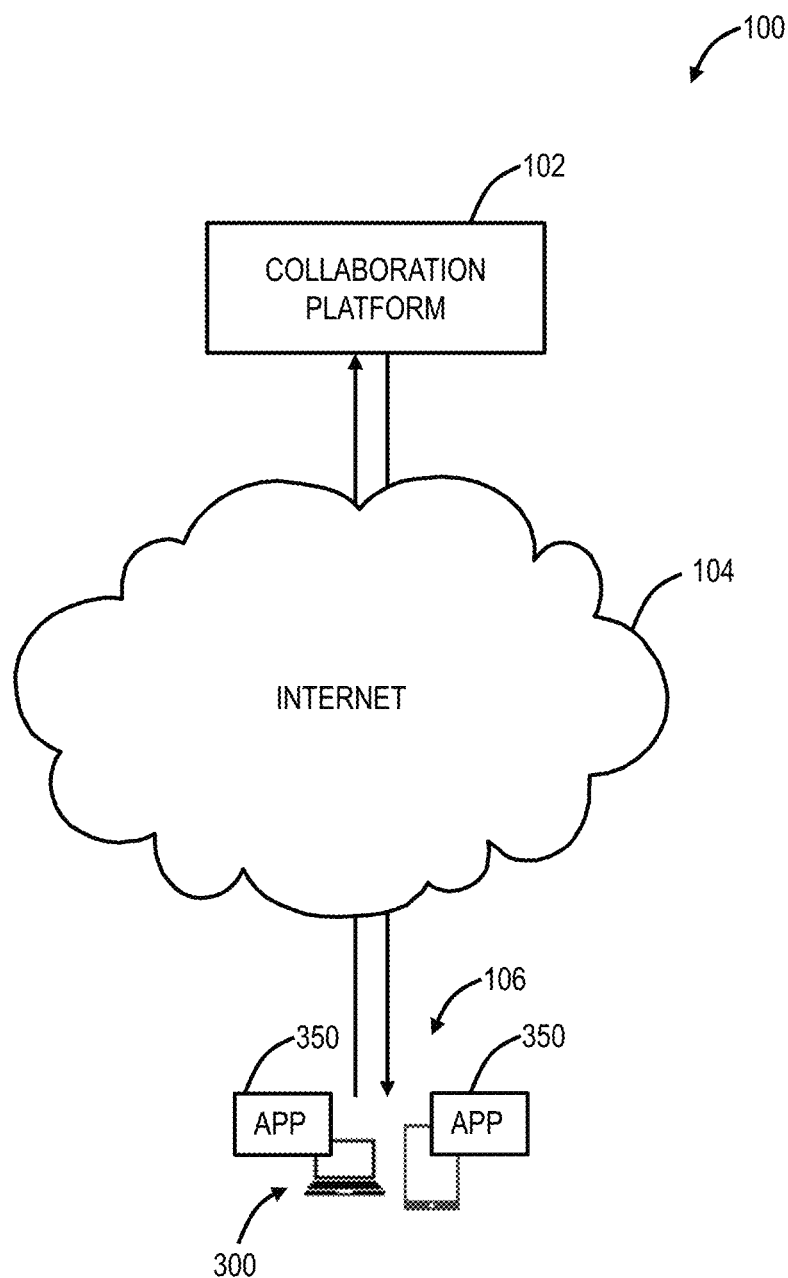
FIG. 1 is a network diagram of a collaboration system.
Figure 2:
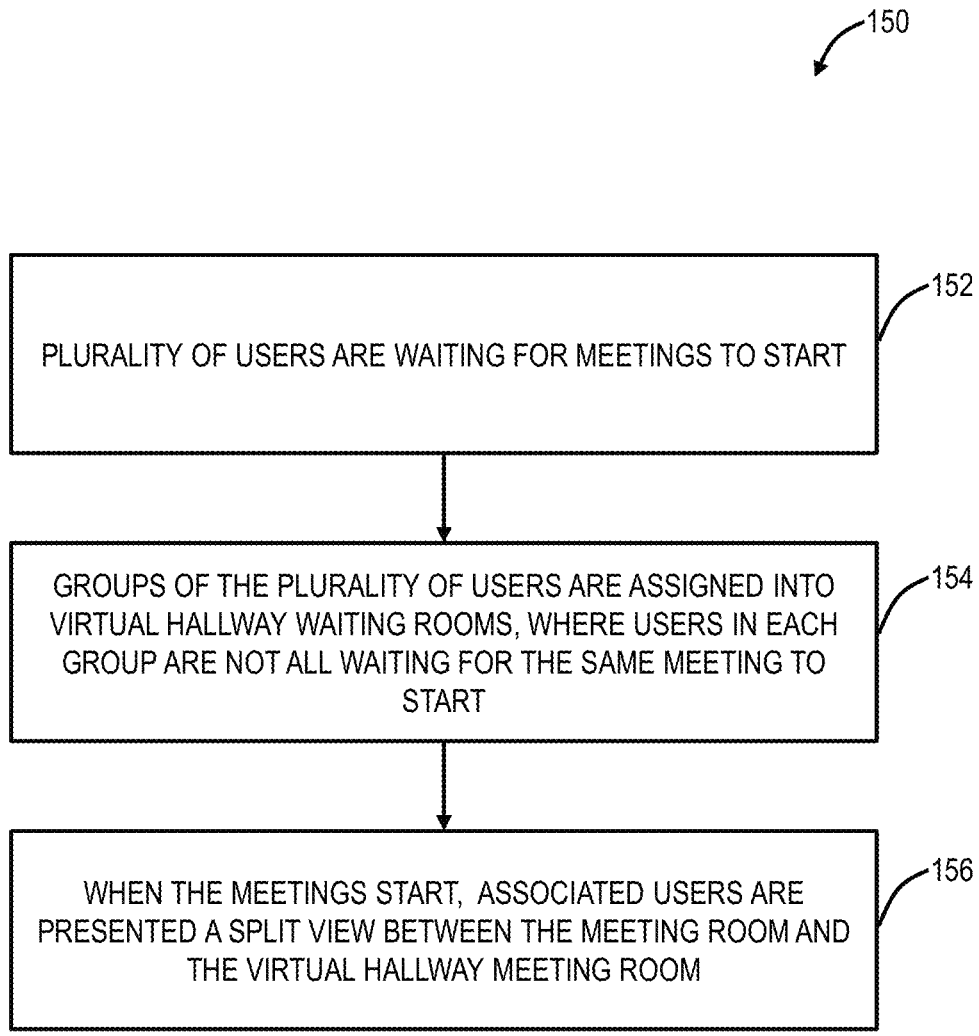
FIG. 2 is a flowchart of a virtual hallway process implemented in the collaboration system of FIG. 1.

FIG. 1 is a network diagram of a collaboration system 100. The collaboration system 100 includes a collaboration platform 102 that is connected to the Internet 104, and possibly other networks (not shown in FIG. 1), and to a plurality of users 106. The collaboration platform 102 can be realized via one or more servers 200, as illustrated in FIG. 2. The collaboration platform 102 can also be a cloud service, e.g., a collaboration service. Various implementations are contemplated. Non-limiting examples of the collaboration platform 102 can include Zoom, Skype, Microsoft Teams, Slack, Google Meet, Google Hangouts, WebEx, Blue Jeans Network, FaceTime, and the like. As is well-known, this collaboration is preplanned and scheduled. That is, meeting invitations are sent and accepted, and the participants are known in advance. This fosters collaboration, but planned collaboration, not hallway conversations.

The collaboration platform 102 can be classified as a meeting tool and a collaboration tool. For the meeting tool (e.g., Zoom, Skype, Hangouts, etc.), this supports virtual meetings for users in a live, remote context. This can include audio and video to support remote collaboration. A second function can include collaboration such as via Internet Relay Chat (IRC)-style chat rooms organized by topic, group, department, etc., e.g., Slack, Teams, Twitter, etc. Note, this does support collaboration, but it is not a live meeting, but rather asynchronous communications, i.e., post and then response. In either scenario, the functionality of the collaboration platform 102 can mimic various communication aspects of a physical office, but they do not support hallway conversation, i.e., informal, live, spontaneous communication between colleagues, including people who may not have a present business need to communicate.

The users 106 can access the collaboration platform 102 via user devices 300, such as laptops, desktops, tablets, smartphones, streaming media devices, etc. Also, the user devices 300 can include applications 350, such as dedicated client apps for the collaboration platform 102, Web browsers, etc. Again, those skilled in the art will recognize various implementations are contemplated.

Existing Collaboration System Functionality

Typically, a meeting is preplanned (scheduled) with defined participants (users 106). At present, the collaboration platform 102 allows a host (a user 106 who schedules the meeting and invites the other participants) to require the participants to wait in individual waiting rooms. That is, wait until the host arrives and allows each participant to enter the meeting room.

It is also possible to create breakout rooms where participants who were together in a meeting room are divided into small groups and are later brought back into the main meeting.

This has been compared to having your colleagues on a bookshelf where you take someone down, talk to them and put them back on the shelf. It is easy to reach anyone that you have a specific reason to talk to, but the casual conversations, which are critical to innovation, have been lost. There have been attempts at scheduling informal get-togethers in the collaboration platform 102, but so far, nothing has come close to re-creating the hallway conversation in the virtual domain.

Slack has a 'Hallways' plugin, available from a company named Hallway. This app allows users to run a bot inside a particular channel that will periodically suggest a 10 min online meeting for members of that channel. The same participants are invited to each meeting room every time, and the meeting times are periodic. Their solution does not look for gaps in people's meeting schedules to suggest a convenient time for everyone to meet.

Virtual Hallway Functionality in the Collaboration System

At the outset, the present disclosure starts with the existing collaboration platform 102 that is used to create virtual meeting rooms where participants collaborate. The virtual hallway functionality can reuse this existing functionality. Generally, the virtual hallway functionality is about arranging people into small virtual waiting rooms before the start of scheduled meetings.

In an embodiment, virtual hallway functionality looks at participants that are currently waiting for meetings and automatically assigns them into rooms based on which groups they are in, how recently they have waited together, or various other factors. That is, the virtual hallway functionality creates a virtual hallway with users 106 that are waiting in the collaboration platform 102. This can be waiting for a preplanned meeting, participating in a chat in a channel, or even where the user 106 is idle.

For example, one of the existing options in Zoom is for the organizer (host) to require participants to wait (alone) in a 'waiting room' until being invited to join the meeting. The virtual hallway functionality extends the waiting room concept by having a process directing multiple people into virtual waiting rooms. While not essential to the design, it may be advisable that organizations implementing this approach should encourage staff to schedule meetings to start 10 minutes after the top of the hour or to encourage participants to arrive early to take advantage of the virtual hallway. This would help to break up the back-to-back meetings that most are unfortunately familiar with. More importantly, it would increase the number of people available to participate in waiting rooms and would provide them with enough time for short conversations. It is also advisable to encourage people to use their cameras more by reminding them that participants who are seen in meetings are much more likely to have their contribution remembered.

When a participant's scheduled meeting starts, a user 106 could be presented with a split-screen that shows the group they were talking with as well as what is happening in their meeting. This can simulate the actual hallway and conference room in the physical office. They could then switch into their meeting when they are ready.

There could be additional functionality within the virtual meeting room to allow subsets of participants to have private conversations.

This approach addresses a real business problem that companies are experiencing and could be integrated as an extension of existing collaboration platforms 102.

Virtual Hallway Process

FIG. 2 is a flowchart of a virtual hallway process 150 implemented in the collaboration system 100. The virtual hallway process 150 contemplates implementation as a method, via the collaboration platform 102 (e.g., through one or more servers 200 configured to implement steps), and as computer-readable code such as stored in a non-transitory computer-readable storage medium for programming a computer to perform steps.

The virtual hallway process 150 includes a plurality of users 106 waiting for corresponding meetings to start (step 152). The users 106 can be associated with the same company, and each user 106 can be in a location, job function, department, etc. That is, users 106 are company-specific, and there is some manner to distinguish each user 106. This manner to distinguish users 106 is a key aspect in terms of assigning people to virtual waiting rooms, as is described herein.

The virtual hallway process 150 includes assigning groups of users into virtual hallway waiting rooms, where users in each group are not necessarily all waiting for the same meeting to start (step 154). Each virtual hallway meeting room can include two or more users 106. The assignment is based on the distinguishing characteristics of each user. Generally, the assignment goal is to mimic/simulate a real hallway conversation.

The users 106 are assigned into different groups, and the probability of a participant being assigned to a waiting room with a participant of each of the other types of groups may be pre-defined. An example of this would be assigned based on job function. A hardware designer might have a high probability of waiting with another hardware designer, such as on a different but closely related component, a lower probability for waiting with someone from system engineering, an even lower probability for waiting with someone from a software team and a low but non-zero chance of waiting with someone from the C-suite (executive management). Also, the assignment may consider location—one would not expect a hallway conversation with someone located in a different office. Further, the assignment may consider department, job function, organizational chart, etc.

That is, the assignment algorithm can be anything that mimics what would be seen in the physical office or which supports a desired collaboration dynamic. And the assignment algorithm can use any distinguishing characteristics of users 106. A junior engineer would not have a hallway conversation with the CEO, typically, but would with a senior team member.

In an embodiment, the assignment algorithm can use historical data for how much people interacted in previous waiting room encounters to influence the probability for future matching. This can be based on feedback obtained from the users 106, e.g., a rating—was this virtual hallway meeting valuable? The feedback can also be based on measures of engagement during the virtual hallway meetings such as how much pairs of participants communicated or how quickly they left the hallway to join their scheduled meeting, i.e., engagement statistics.

In another embodiment, the assignment algorithm can look at other interactions between users 106, such as through email or other mediums, to consider the matching or between people who those people communicate with a lot to influence the probability for matching.

In a further embodiment, the plurality of users 106 may be publicly listed and a given user 106 to choose to be assigned to a waiting area with a particular person or group. In this embodiment, it is possible that the users are not necessarily waiting for meetings, but may simply be entering a virtual space to see who they can strike up a conversation with.

The meeting host can be able to see the status/location of the invited participants. Here, the meeting host may decide to delay the start of the meeting to foster the virtual hallway meetings.

Similarly, the participants can see when their meeting has started, including how many people are in the meeting and possibly have a 'doorway' view of the meeting before switching into that meeting. They could also see which scheduled meeting participants are in waiting rooms waiting for the meeting to start, and decide to remain in the virtual hallway, or leave for the meeting. The 'doorway' could include a notification to someone in their waiting room that their scheduled meeting is about to start (let's say because a host presses a button or is at a certain attendance %, etc.). The participant could use the doorway to decide whether to leave the virtual hallway to switch to the meeting.

The virtual hallway meeting can end with an option presented to participants leaving a waiting area to automatically meet again at a time when they are both available.

Matching Engine

Figure 3:
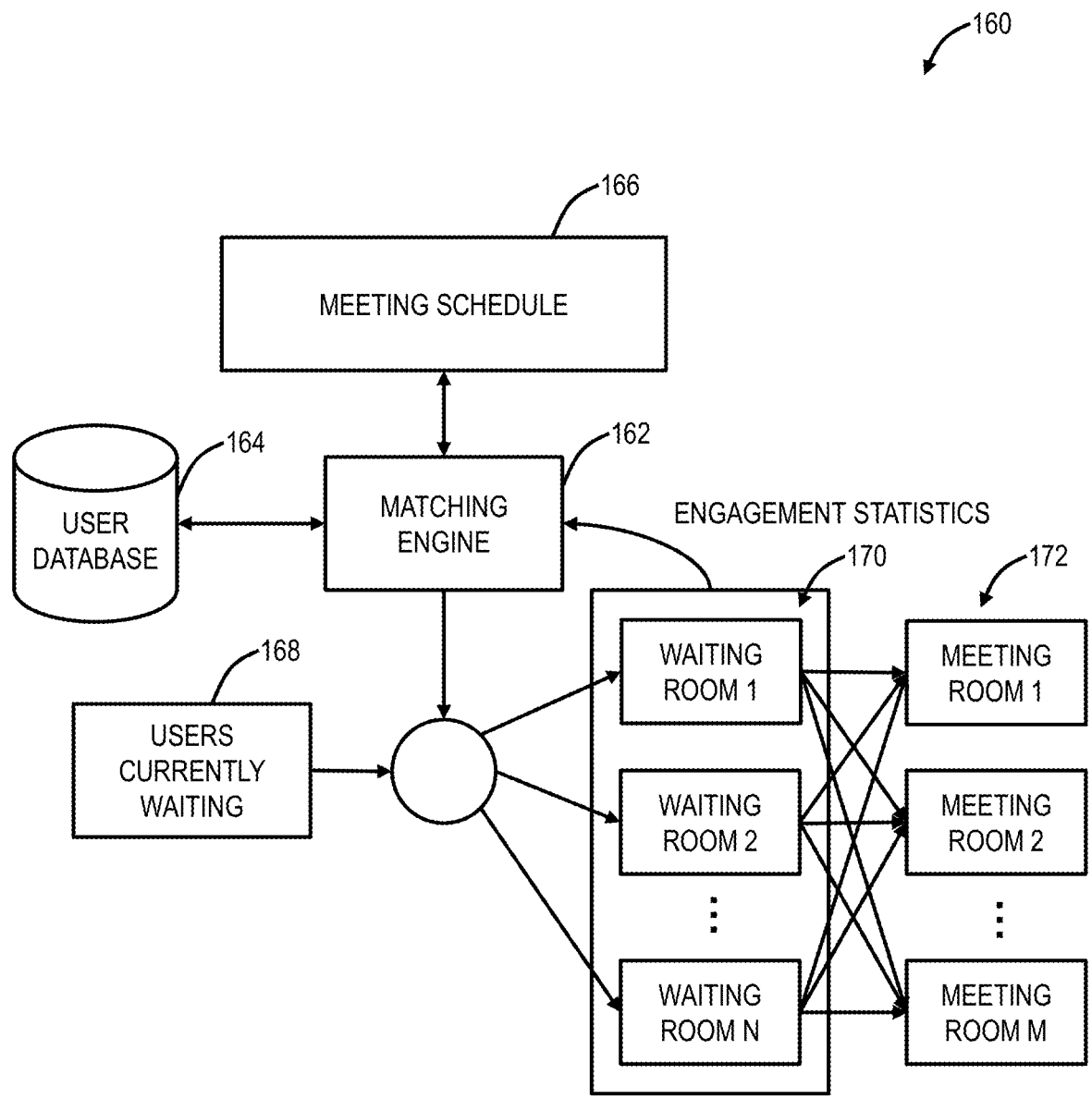
FIG. 3 is flow diagram of interactions in a virtual hallway system that can be implemented in the collaboration system of FIG. 1.

FIG. 3 is flow diagram of interactions in a virtual hallway system 160 that can be implemented in or with the collaboration system 100. The virtual hallway system 160 includes a matching engine 162 that can communicate with a user database 164. The matching engine 162 can be a method, computer-readable code, implemented by a server 200, implemented via the collaboration platform 102. Functionally, the matching engine 162 is configured to match up users 106 such as those waiting for meetings 168 and to assign them to virtual hallway waiting rooms 170. This assignment may be made in consideration of the users meeting schedules 166. In a typical embodiment, the matching engine 162 matches the waiting users 168 with a probabilistic function based on job function or other information stored in the user database 164. Access to the meeting schedule 166 can be included as an additional input.

The meeting schedule 166 can be maintained in an email server, platform, and/or service, calendaring server, platform, and/or service, etc. For example, the meeting schedule 166 can be in an Exchange server or Outlook 365 online. Of course, any implementation is contemplated. The meeting schedule 166 is used for employees to see the availability of colleagues for automatically scheduling meetings. The present disclosure contemplates integrating the collaboration platform 102, the virtual hallway process 150, and/or the virtual hallway system 160 with the already maintained meeting schedules 166.

The matching engine 162 performs assignments for the virtual hallway conversations. The matching engine 162 has visibility of all users 106, including waiting users 168, as well as the user database 164, and visibility of activity (meetings) via the meeting schedule 166. The matching engine 162 might consider future schedules if, for example, the matching engine 162 can see that certain users 106 have multiple meetings at the same time that day so it is not as important to match them immediately.

The matching engine 162 can include connectivity to the collaboration platform 102, or it may be implemented as part of the collaboration platform 102. As such, the matching engine 162 further has a view of the users 168 currently waiting. Thus, the matching engine 162 can assign the users 168 currently waiting to virtual hallway waiting rooms 170 (in FIG. 3, there are an example of N virtual hallway waiting rooms 170, N 1). The users currently waiting 168 are waiting to enter M meeting rooms 172 for preplanned meetings, based on the meeting schedule 166, M 1, and M and N do not necessarily need to be equal.

Generally, the matching engine 162 implements the intelligence for matching the waiting users 168, to mimic actual hallway conversations. The matching engine 162 can consider how desirable a match is as well as how difficult it is to find times when particular combinations of users 106 are available. A highly desirable match could be preempted by a less desirable match if the participants for the less desirable match are rarely available and the matching engine 162 can see that it will be easy to find a time for the others to meet later.

Also, the matching engine 162 is not limited to combinations of pairs of individuals. Rather, the pairing can be based on combinations of individuals, groups, departments, teams, job functions, locations, etc.

In an embodiment, a new employee can have the matching engine 162 favor putting them in virtual hallway waiting rooms 170 with senior staff who are recognized as skilled mentors for the first several weeks of their employment. Also, the level of engagement is quantified, and ongoing interactions can be arranged with a mentor where a connection has been observed.

The virtual hallway waiting rooms 170 can provide feedback to the matching engine 162, namely engagement statistics. This can include direct user feedback, indirect feedback such as time in the waiting room 170, bandwidth statistics to infer the level of communication, etc.

The matching engine 162 can use these engagement statistics to adjust future matchings.

Also, matching is not limited to the subset of users waiting 168 for meetings 172. In the collaboration platform 102, the present disclosure also contemplates any user 106 entering just to have hallway conversations, e.g., a virtual breakroom, a virtual lunch table, happy hour, etc. The key is that the matching engine 162 provides some pairing logic to connect users 106 such as those currently waiting for meetings 168 for virtual hallway conversations.

Note, the users 168 currently waiting for meetings are a subset of the users 106 of the collaborative platform 102. Users include those waiting for meetings 168 as well as those currently in meetings, working, idling etc. The present embodiment allows for hallway conversations to be initiated or suggested between users 106 in any combination of these states.

Idle Users

The users 106 may be working away and not in meetings through the collaboration platform 102. The users 106 may have the app 350 on their user device 300 operating but in the background. It is even possible to support hallway conversations with users 106 who are not in waiting rooms but simply working at home.

For example, when the user device 300 notices the user 106 is idle (gets up for a bathroom break) and returns, the user 106 may be presented an option to enter into a virtual hallway meeting room. The idea here is the user 106 has taken a break and is returning now, and it may make sense for the user 106 to have a virtual hallway conversation, as may happen walking to the break room. By timing this with a switch between idle to active and vice versa on the user device 300, it is less intrusive. Also, this may be presented as an option that can be ignored or canceled.

The assignment here can use the same assignment algorithm as in the virtual hallway process 150.

Example Server Architecture

Figure 4:
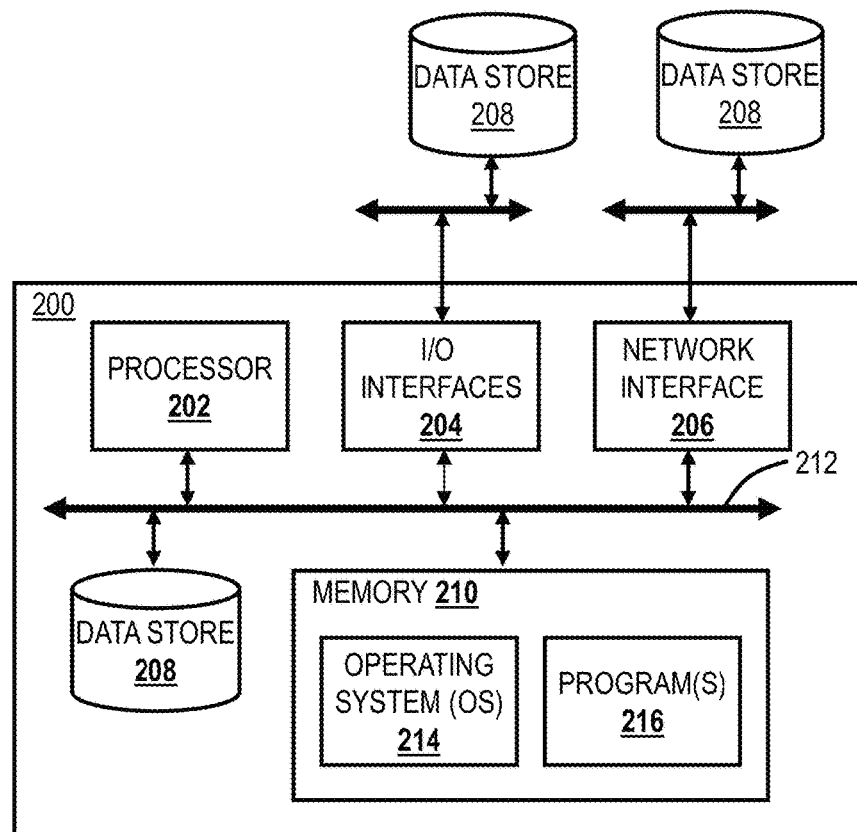
FIG. 4 is a block diagram of a server that may be used to realize aspects of the collaboration platform in the collaboration system of FIG. 1.

FIG. 4 is a block diagram of a server 200, which may be used to implement the collaboration platform 102. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Cloud

The server 200 can be used to form a cloud system, such as a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." In an embodiment, the collaboration platform 102 can be implemented as a cloud service or SaaS.

Example User Device Architecture

Figure 5:
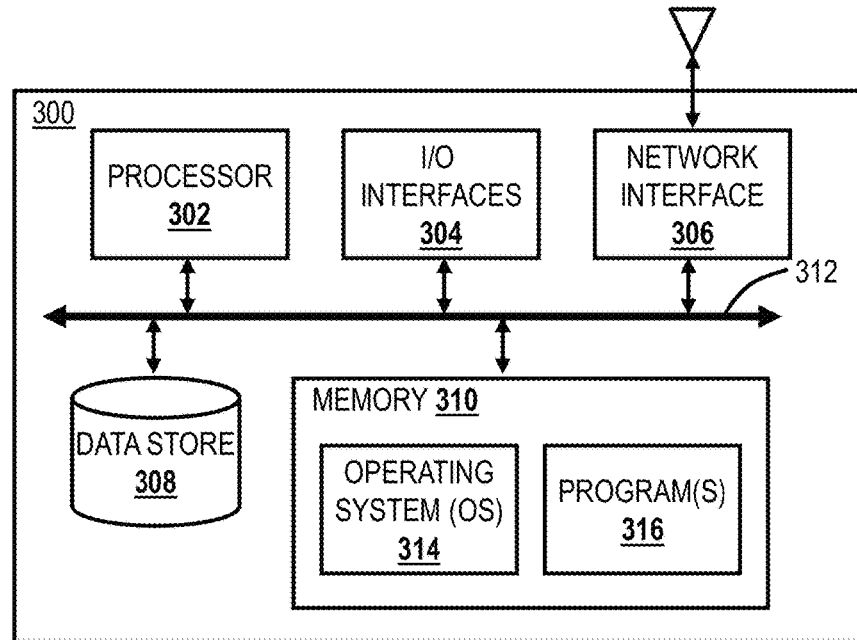
FIG. 5 is a block diagram of a user device that may be used with the collaboration system of FIG. 1.

FIG. 5 is a block diagram of a user device 300, which may be used by a user 106 to access the collaboration platform 102. Specifically, the user device 300 can form a device used by one of the users 106, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like.

Process

Figure 6:
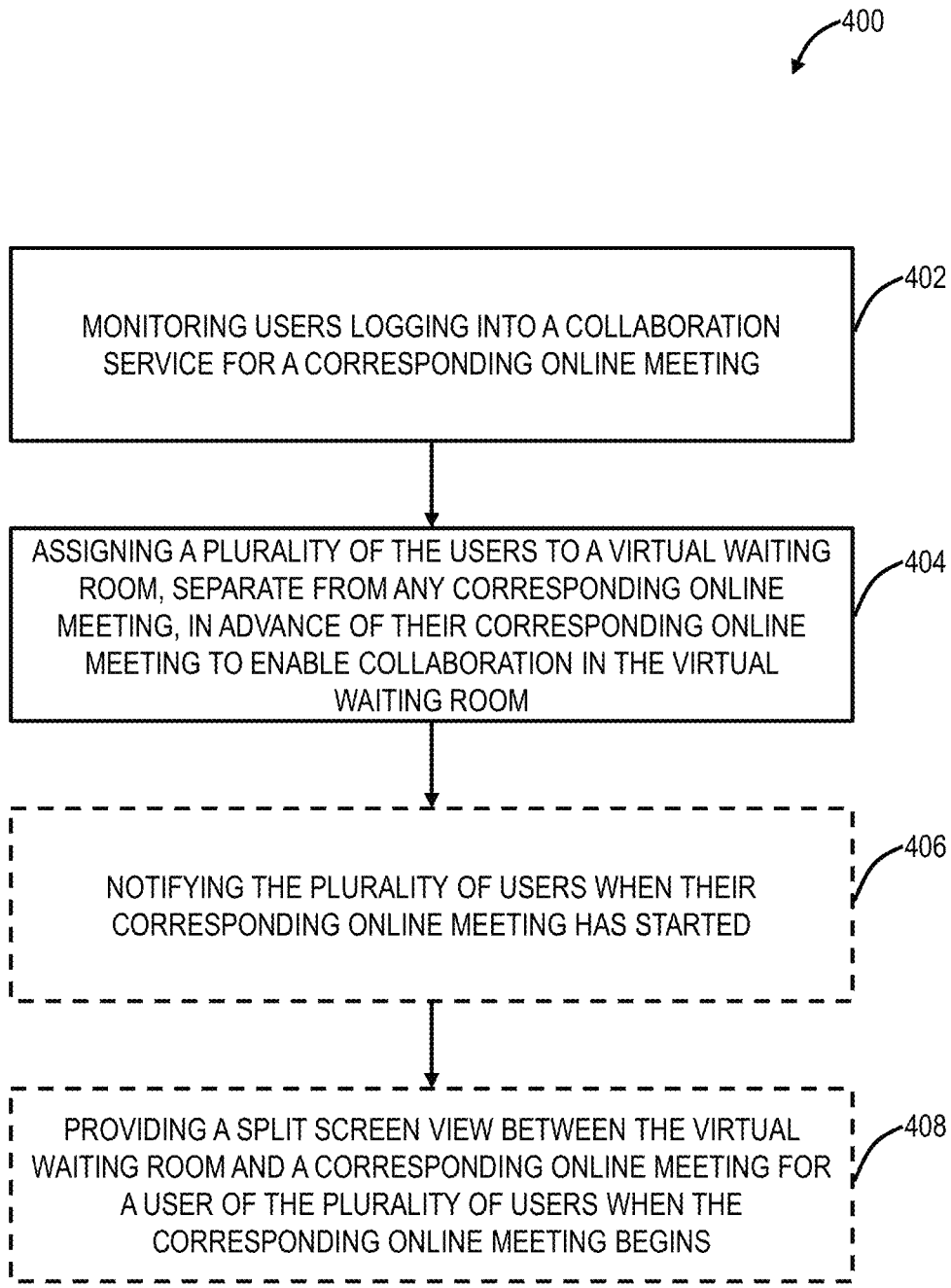
FIG. 6 is a flowchart of a process for virtual hallway conversations to support remote collaboration.

FIG. 6 is a flowchart of a process 400 for virtual hallway conversations to support remote collaboration. The process 400 can be implemented as a computer-implemented method, via the server 200 with at least one processor configured to implement the steps, and as instructions for the steps in a non-transitory computer-readable medium.

The process 400 includes monitoring users logging into a collaboration service for a corresponding online meeting (step 402); and assigning a plurality of the users to a virtual waiting room, separate from any corresponding online meeting, in advance of their corresponding online meeting to enable collaboration in the virtual waiting room (step 404).

The process 400 can further include notifying the plurality of users when their corresponding online meeting has started (step 406). The process 400 can further include providing a split screen view between the virtual waiting room and a corresponding online meeting for a user of the plurality of users when the corresponding online meeting begins (step 408). The split screen can include a doorway view where the corresponding online meeting is shown in the doorway.

Some or all of the plurality of the users assigned to the virtual waiting room can be waiting for different corresponding online meetings. The assigning can be based on a profile of each of the plurality of users. The process 400 can further include tracking the assigning of the plurality of users; and utilizing the tracking for future assignments. The process 400 can further include obtaining data related to interaction of the users, wherein the interaction is via email or other electronic communication mechanisms; and utilizing the data related to interaction of the users, for the assigning. The profile can include a job function.

The process 400 can further include providing a list of people in the virtual waiting room to a user to allow the user to request the virtual waiting room. The process 400 can further include providing a meeting host for a corresponding online meeting a list of the plurality of users currently in virtual waiting rooms. The process 400 can further include providing the plurality of users in the virtual waiting room an option to schedule a future meeting based on their availability.

Metrics

The objective of the virtual hallway conversation is to simulate the office environment and the various interactions that occur therein. It is possible to design metrics that measure the quality of interactions within the hallway conversations. These metrics could be used to improve the grouping of individuals into future hallway conversations. They can also be used as a signal for how important different people are within the organization. If you put me into an informal meeting with someone what is the probability that the person sends an email later that day and CC's me, presumably to discuss the wonderful idea that we came up with in the virtual hallway. What would matter is the probability of that happening compared with the observed probability for all of the days when we didn't have meetings.

It is also possible to look at how much the people within the meeting talk and what fraction of the time does each person spend talking. As you start to try a lot of different groupings, you might start to see that three individuals would normally talk a lot but if we add a particular fourth they do not talk at all. Does that fourth person have the same effect on other groups? Conversely are there people who when added to the group cause quiet people to talk or better yet help the quiet person in a group of normally very talkative people to be heard. You could measure mood or wellness by looking at how their tone of voice changes from day to day. You could correlate that with other data from the company such as an earnings report or salary announcement. Of course, we include systems and methods to feed all of this back into a system like Workday to help flag the lynch pins in the company and to help make sure everyone gets paid the optimal amount. If nothing else the search report will help to confirm my beliefs about what Workday is really doing.

The measures listed above are not limited to use in virtual waiting rooms they could also be used in the main meeting.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, at least one processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable storage medium having computer-readable code stored thereon for programming at least one processor to perform steps of:
monitoring users logging into a collaboration service for a corresponding online meeting;
assigning, by the collaboration service, a plurality of the users to a virtual waiting room, separate from any corresponding online meeting, in advance of their corresponding online meeting;
establishing, by the collaboration service, at least one of audio or video communication between the assigned plurality of users in the virtual waiting room; and
providing a split screen view between the virtual waiting room and the corresponding online meeting for a user of the plurality of users.

2. The non-transitory computer-readable storage medium of claim 1, wherein the steps further include
notifying the plurality of users when their corresponding online meeting has started.

3. The non-transitory computer-readable storage medium of claim 1, wherein the split screen view is provided when the corresponding online meeting begins.

4. The non-transitory computer-readable storage medium of claim 1, wherein the split screen view includes a doorway view where the corresponding online meeting is shown in the doorway.

5. The non-transitory computer-readable storage medium of claim 1, wherein some or all of the plurality of the users assigned to the virtual waiting room are waiting for different corresponding online meetings.

6. The non-transitory computer-readable storage medium of claim 1, wherein the assigning is based on a profile of each of the plurality of users.

7. The non-transitory computer-readable storage medium of claim 6, wherein the steps further include
tracking the assigning of the plurality of users; and
utilizing the tracking for future assignments.

8. The non-transitory computer-readable storage medium of claim 6, wherein the steps further include
obtaining data related to interaction of the users, wherein the interaction is via email or other electronic communication mechanisms; and
utilizing the data related to interaction of the users, for the assigning.

9. The non-transitory computer-readable storage medium of claim 6, wherein the profile includes a job function.

10. The non-transitory computer-readable storage medium of claim 1, wherein the steps further include
providing a list of people in the virtual waiting room to a user to allow the user to request the virtual waiting room.

11. The non-transitory computer-readable storage medium of claim 1, wherein the steps further include
providing a meeting host for a corresponding online meeting a list of the plurality of users currently in virtual waiting rooms.

12. The non-transitory computer-readable storage medium of claim 1, wherein the steps further include
providing the plurality of users in the virtual waiting room an option to schedule a future meeting based on their availability.

13. A method performed by an apparatus comprising at least one processor and memory storing instructions that, when executed, cause the at least one processor to carry out the steps comprising:
monitoring users logging into a collaboration service for a corresponding online meeting;
assigning, by the collaboration service, a plurality of the users to a virtual waiting room, separate from any corresponding online meeting, in advance of their corresponding online meeting;
establishing, by the collaboration service, at least one of audio or video communication between the assigned plurality of users in the virtual waiting room; and
providing a split screen view between the virtual waiting room and the corresponding online meeting for a user of the plurality of users.

14. The method of claim 13, wherein the steps further include notifying the plurality of users when their corresponding online meeting has started for the plurality of users to leave the virtual waiting room.

15. The method of claim 13, wherein the split screen view is provided when the corresponding online meeting begins.

16. The method of claim 13, wherein some or all of the plurality of the users assigned to the virtual waiting room are waiting for different corresponding online meetings.

17. The method of claim 13, wherein the assigning is based on a profile of each of the plurality of users.

18. The method of claim 13, wherein the steps further include
providing a list of people in the virtual waiting room to a user to allow the user to request the virtual waiting room.

19. The method of claim 13, wherein the steps further include
providing a meeting host for a corresponding online meeting a list of the plurality of users currently in the virtual waiting room.

20. An apparatus comprising at least one processor and memory storing instructions that, when executed, cause the at least one processor to:
monitor users logging into a collaboration service for a corresponding online meeting,
assign, by the collaboration service, a plurality of the users to a virtual waiting room, separate from any corresponding online meeting, in advance of their corresponding online meeting,
establish, by the collaboration service, at least one of audio or video communication between the assigned plurality of users in the virtual waiting room, and provide a split screen view between the virtual waiting room and the corresponding online meeting for a user of the plurality of users.

\* \* \* \* \*